United States Patent
Spears et al.

(10) Patent No.: US 9,244,812 B2
(45) Date of Patent: Jan. 26, 2016

(54) METHODS AND SYSTEMS IN AN AUTOMATION SYSTEM FOR VIEWING A CURRENT VALUE OF A POINT IDENTIFIED IN CODE OF A CORRESPONDING POINT CONTROL PROCESS

(75) Inventors: Lonnie Douglas Spears, Racine, WI (US); Charles James Koerner, Aurora, IL (US)

(73) Assignee: Siemens Industry, Inc., Alpharetta, GA (US)

( * ) Notice: Subject to any disclaimer, the term of this patent is extended or adjusted under 35 U.S.C. 154(b) by 512 days.

(21) Appl. No.: 13/362,401

(22) Filed: Jan. 31, 2012

(65) Prior Publication Data

US 2013/0198222 A1 Aug. 1, 2013

(51) Int. Cl.
   G06F 3/048 (2013.01)
   G06F 11/36 (2006.01)
   G06F 3/01 (2006.01)

(52) U.S. Cl.
   CPC .................. G06F 11/3636 (2013.01)

(58) Field of Classification Search
   CPC ... G06F 8/34; G06F 11/3664; G06F 11/3668; G06F 11/3656; G06F 11/3604
   USPC .......... 715/705, 708, 711, 764, 808
   See application file for complete search history.

(56) References Cited

U.S. PATENT DOCUMENTS

| | | | |
|---|---|---|---|
| 6,311,323 B1 * | 10/2001 | Shulman et al. | 717/111 |
| 6,542,163 B2 * | 4/2003 | Gorbet et al. | 715/711 |
| 6,828,988 B2 * | 12/2004 | Hudson et al. | 715/711 |
| 7,086,006 B2 * | 8/2006 | Subramanian et al. | 715/747 |
| 7,114,136 B2 * | 9/2006 | Chase et al. | 324/501 |
| 8,281,242 B2 * | 10/2012 | Gomes et al. | 715/711 |
| 8,453,252 B2 * | 5/2013 | Shah | 726/27 |
| 8,607,189 B2 * | 12/2013 | Austin et al. | 717/105 |
| 8,615,683 B2 * | 12/2013 | Guenther et al. | 714/38.1 |
| 8,661,409 B2 * | 2/2014 | Austin | 717/113 |
| 8,752,017 B2 * | 6/2014 | Hossain et al. | 717/124 |

(Continued)

FOREIGN PATENT DOCUMENTS

EP 1970803 A2 9/2008

OTHER PUBLICATIONS

"GE Fanuc Automation Cimplicity Monitoring and Control Products HMI", Jan. 1, 1998, pp. i-iv, 1-75, XP055059431, Retrieved from internet: URL:http://www.koamtech.com/sub_fa/MMI/HMI_Catalog_English/HMI_Catalog_English.pdf (78 pages).

(Continued)

*Primary Examiner* — Nicholas Augustine

(57) ABSTRACT

Automation systems, methods, and mediums. A method includes displaying, in a user interface, a portion of code associated with a process running in the automation system. The process is associated with a point variable in the automation system. The portion of code includes the point variable. The method further includes identifying a location of a cursor in a user interface in response to detecting the cursor in the location associated with the user interface for a period of time. The method includes requesting the point value of the point variable in the portion of code and associated with the location of the cursor. The method includes receiving the value associated with the variable over a network connection. The method includes displaying the point value in the user interface in association with the point variable.

20 Claims, 6 Drawing Sheets

(56) References Cited

U.S. PATENT DOCUMENTS

| | | | |
|---|---|---|---|
| 2003/0105620 A1* | 6/2003 | Bowen | 703/22 |
| 2004/0056894 A1* | 3/2004 | Zaika et al. | 345/762 |
| 2005/0028107 A1* | 2/2005 | Gomes et al. | 715/762 |
| 2005/0114779 A1* | 5/2005 | Griesmer | 715/711 |
| 2005/0125788 A1* | 6/2005 | Lupini et al. | 717/174 |
| 2005/0154559 A1* | 7/2005 | Jager | G06F 11/3684 702/182 |
| 2005/0262454 A1* | 11/2005 | Chase et al. | 716/4 |
| 2007/0168994 A1 | 7/2007 | Barsness et al. | |
| 2008/0209030 A1* | 8/2008 | Goldszmidt et al. | 709/224 |
| 2009/0016713 A1* | 1/2009 | Liu et al. | 398/17 |
| 2012/0102459 A1* | 4/2012 | Bates | 717/124 |

OTHER PUBLICATIONS

PCT Search Report dated Apr. 23, 2013, for application No. PCT/US2013/023769. (11 pages).

* cited by examiner

METHODS AND SYSTEMS IN AN AUTOMATION SYSTEM FOR VIEWING A CURRENT VALUE OF A POINT IDENTIFIED IN CODE OF A CORRESPONDING POINT CONTROL PROCESS

TECHNICAL FIELD

The present disclosure is directed, in general, to automation systems and, more particularly, to receiving and displaying a point value for a point variable in an automation system.

BACKGROUND OF THE DISCLOSURE

Building automation systems encompass a wide variety of systems that aid in the monitoring and control of various aspects of building operation. Building automation systems include security systems, fire safety systems, lighting systems, and HVAC systems. The elements of a building automation system are widely dispersed throughout a facility. For example, an HVAC system may include temperature sensors and ventilation damper controls, as well as other elements that are located in virtually every area of a facility. These building automation systems typically have one or more centralized control stations from which system data may be monitored and various aspects of system operation may be controlled and/or monitored.

To allow for monitoring and control of the dispersed control system elements, building automation systems often employ multi-level communication networks to communicate operational and/or alarm information between operating elements, such as sensors and actuators, and the centralized control station. One example of a building automation system is the APOGEE® building automation system, available from Siemens Industry, Inc. Building Technologies Division of Buffalo Grove, Ill. ("Siemens"). In this system, several control stations connected via an Ethernet or another type of network may be distributed throughout one or more building locations, each having the ability to monitor and control system operation.

SUMMARY OF THE DISCLOSURE

Various disclosed embodiments relate to systems and methods for receiving and displaying values for variables in an automation system.

Various embodiments include automation systems, methods, and mediums. A method includes displaying, in a user interface, a portion of code associated with a process running in the automation system. The process is associated with a point variable in the automation system. The portion of code includes the point variable. The method further includes identifying a location of a cursor in a user interface in response to detecting the cursor in the location associated with the user interface for a period of time. The method includes requesting the point value of the point variable in the portion of code and associated with the location of the cursor. The method includes receiving the value associated with the variable over a network connection. The method includes displaying the point value in the user interface in association with the point variable.

The foregoing has outlined rather broadly the features and technical advantages of the present disclosure so that those skilled in the art may better understand the detailed description that follows. Additional features and advantages of the disclosure will be described hereinafter that form the subject of the claims. Those of ordinary skill in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

Figure 1:
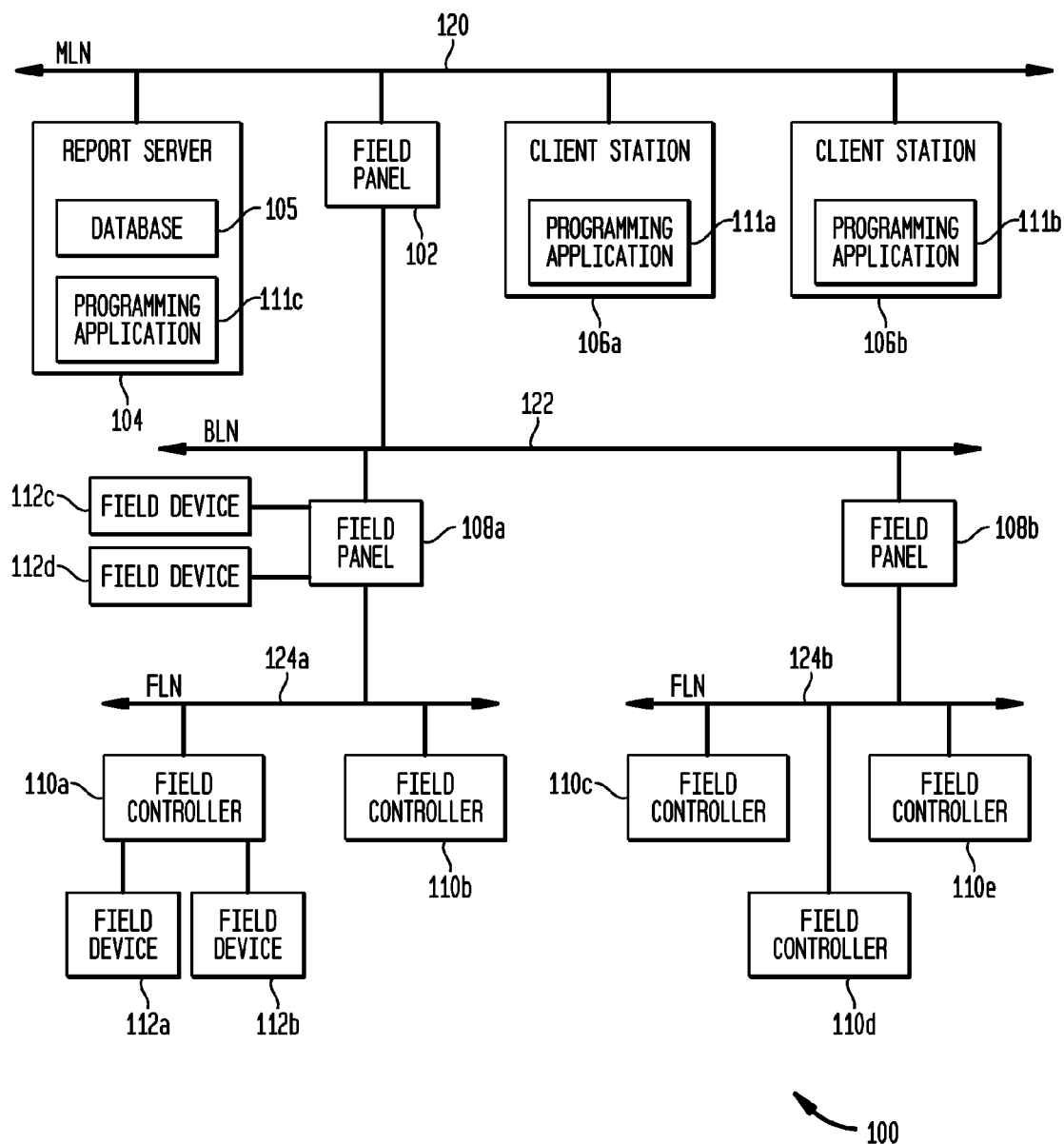
FIG. 1 illustrates a block diagram of an automation system in which various embodiments of the present disclosure can be implemented.

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device or system.

Control stations and controlled devices in an automation system use control programs to perform functions in an automation environment. One example of a programming language used in an automation environment is Powers Process Control Language (PPCL). PPCL consists of various types of statements, each performing a different task. Put together, these statements become ordered instructions called control programs which are executed at the control stations and controlled devices. An operator can create, modify, and delete control programs using a programming application. One example of a programming language used in an automation environment is Program Editor available from Siemens.

When creating or modifying control programs, the outcome of a statement may depend on a point variable. For example, values for temperature, humidity, time of day, and device may change a result of a statement in a control programs. When creating or modifying control programs, it may be useful to know a current point value for a point variable. For example, knowing a current point value of a point variable may be useful for accurately testing or debugging control programs prior to the control program being used in the automation system.

In these illustrative embodiments, the point variable is a value associated with an input/output of a field device that is monitored and/or controlled by a field panel and/or field controller in an automation system. The point variable may also be an element in a line of code whose value may change. For example, the point variable may be a value representing a building environment condition. The point variable may be a current value or in some examples a previous value for the building environment condition. For example, without limitation, the point variable may be a temperature, humidity, pressure, flow rate, state of a control process, gain on a loop in a device, alarm status, device status, and/or any other type of building environment condition.

Disclosed embodiments provide users with the ability to identify point values for variables within a line of program code while creating or modifying control programs from a workstation while such control programs are hosted in a field panel or controller across a network. For example, disclosed embodiments provide a point value for a point variable in a user interface when a cursor pauses on or "hovers over" the point variable in a line of program code. Providing the user with the point value for the point variable allows a user to see the point value for the point variable in real time as the control program is being created or modified.

FIG. 1 illustrates a block diagram of an automation system 100 in which various embodiments of the present disclosure can be implemented. The automation system 100 is an environmental control system configured to control at least one of a plurality of environmental parameters within a building or buildings, such as temperature, humidity, lighting and/or the like. For example, for a particular embodiment, the automation system 100 may comprise the APOGEE® building automation system that allows the setting and/or changing of various controls of the system. While a brief description of the automation system 100 is provided below, it will be understood that the automation system 100 described herein is only one example of a particular form or configuration for an automation system and that the automation system 100 may be implemented in any other suitable manner without departing from the scope of this disclosure.

For the illustrated embodiment, the automation system 100 comprises a field panel controller 102, a report server 104, a plurality of client stations 106a-b, a plurality of field panels 108a-b, a plurality of field controllers 110a-e, and a plurality of field devices 112a-d. Although illustrated with two client stations 106, three field panels 102 and 108, five field controllers 110 and four field devices 112, it will be understood that the system 100 may comprise any suitable number of any of these components 102, 106, 108, 110, and 112 based on the particular configuration for a particular building.

The field panel 102, which may comprise a computer or a general-purpose data processing system, is configured to provide overall control and monitoring of the automation system 100. The field panel 102 may operate as a data server that is capable of exchanging data with various elements of the automation system 100. As such, the field panel 102 may allow access to system data by various applications that may be executed on the field panel 102 or other supervisory computers (not shown in FIG. 1). In one embodiment, the field panel 102 may be a PXC programmable controller available from Siemens.

For example, the field panel 102 may be capable of communicating with other supervisory computers, Internet gateways, or other gateways to other external devices, as well as to additional network managers (which in turn may connect to more subsystems via additional low-level data networks) by way of a management level network (MLN) 120. The field panel 102 may use the MLN 120 to exchange system data with other elements on the MLN 120, such as the report server 104 and one or more client stations 106. The MLN 120 may comprise an Ethernet or similar wired network and may employ TCP/IP, BACnet and/or other protocols that support high-speed data communications. In some embodiments, the field panel 102 may function as a router enabling communication between various components in MLN 102 and BLN 122. For example, automation system 100 may have a hierarchy of field panels on which field panel 102 may route information to and from field panels 108.

The report server 104 may be configured to generate reports regarding various aspects of the automation system 100. In various embodiments, the report server 104 includes database 105. The database 105 stores information regarding devices within automation system 100. For example, the database 105 may maintain a list of device identifiers and routing numbers of devices present within automation system 100. Devices in the automation system 100, for example client stations 106, may access the database 105 to identify other devices, for example field devices 112, that are controlled and/or monitored within the automation system 100. Additionally, the database 105 may store point values for point variables that monitored and/or controlled within the automation system 100. For example, the report server 104 may receive point values from the field panels 108 and/or the field controllers 110 and store the received point values in the database 105. To conserve network and/or storage resources, the report server 104 may receive new values for the point variables periodically. For example, the report server 104 may receive new values at predetermined intervals. In another example, report server 104 may receive new values when a certain amount of change in a point value occurs (e.g., change of value (COV)).

Each client station 106 may be configured to communicate with the automation system 100 to receive information from and/or provide modifications to the automation system 100 in any suitable manner. For example, client stations 106 may be computers or data processing systems. In these illustrative embodiments, client stations 106 and report server 104 provide programming applications 111a-c, respectively. Programming applications 111 are software applications that allow a user to create, modify, and/or delete a program code for a control program. For example, programming applications 111 may allow a user to create, modify, and/or delete a program code for a control program for any one of field panels 102 and 108 and field controllers 110 in automation system 100. In some embodiments, client stations 106 and report server 104 implement one or more Insight® workstation applications available from Siemens. Insight® workstation is an application that provides a graphical interface for building management and control operations.

The field panel 102 may also be configured to accept modifications and/or other input from a user. This may be accomplished via a user interface of the field panel 102 or any other user interface that may be configured to communicate with the field panel 102 through any suitable network or connection. The user interface may include a keyboard, touchscreen, mouse, or other interface components. The field panel 102 is configured to, among other things, affect or change operational data of the field panels 108, as well as other components of the automation system 100. The field panel 102 may use a building level network (BLN) 122 to exchange system data with other elements on the BLN 122, such as the field panels 108.

Each field panel 108 may comprise a general-purpose processor and is configured to use the data and/or instructions from the field panel 102 to provide control of the respective field panel's one or more corresponding field controllers 110. While the field panel 102 is generally used to make modifications to one or more of the various components of the automation system 100, a field panel 108 may also be able to provide certain modifications to one or more parameters of the automation system 100. Each field panel 108 may use a field level network (FLN) 124 to exchange system data with other elements on the FLN 124, such as a subset of the field controllers 110 coupled to the field panel 108. In one embodiment, the field panels 108 may be a PXC programmable controller available from Siemens.

Each field controller 110 may comprise a general-purpose processor and may correspond to one of a plurality of localized, standard building automation subsystems, such as building space temperature control subsystems, lighting control subsystems, or the like. For a particular embodiment, the field controllers 110 may comprise the model TEC (Terminal Equipment Controller) available from Siemens. However, it will be understood that the field controllers 110 may comprise any other suitable type of controllers without departing from the scope of the present invention.

To carry out control of its corresponding subsystem, each field controller 110 may be coupled to one or more field devices 112. Each field controller 110 is configured to use the data and/or instructions from its corresponding field panel 108 to provide control of its one or more corresponding field devices 112. For some embodiments, some of the field controllers 110 may control their subsystems based on sensed conditions and desired set point conditions. For these embodiments, these field controllers 110 may be configured to control the operation of one or more field devices 112 to attempt to bring the sensed condition to the desired set point condition. It is noted that in the automation system 100, information from the field devices 112 may be shared between the field controllers 110, the field panels 108, the field panel 102 and/or any other elements on or connected to the automation system 100.

In order to facilitate the sharing of information between subsystems, groups of subsystems may be organized into an FLN 124. For example, the subsystems corresponding to the field controllers 110a and 110b may be coupled to the field panel 108a to form the FLN 124a. The FLNs 124 may each comprise a low-level data network that may employ any suitable proprietary or open protocol.

Each field device 112 may be configured to measure, monitor, and/or control various parameters of the automation system 100. Examples of field devices 112 include lights, thermostats, temperature sensors, fans, damper actuators, heaters, chillers, alarms, HVAC devices, and numerous other types of field devices. The field devices 112 may be capable of receiving control signals from and/or sending signals to the field controllers 110, the field panels 108 and/or the field panel 102 of the automation system 100. Accordingly, the automation system 100 is able to control various aspects of building operation by controlling and monitoring the field devices 112.

As illustrated in FIG. 1, any of the field panels 108, such as the field panel 108a, may be directly coupled to one or more field devices 112, such as the field devices 112c and 112d. For this type of embodiment, the field panel 108a may be configured to provide direct control of the field devices 112c and 112d instead of control via one of the field controllers 110a or 110b. Therefore, for this embodiment, the functions of a field controller 110 for one or more particular subsystems may be provided by a field panel 108 without the need for a field controller 110.

Figure 2:
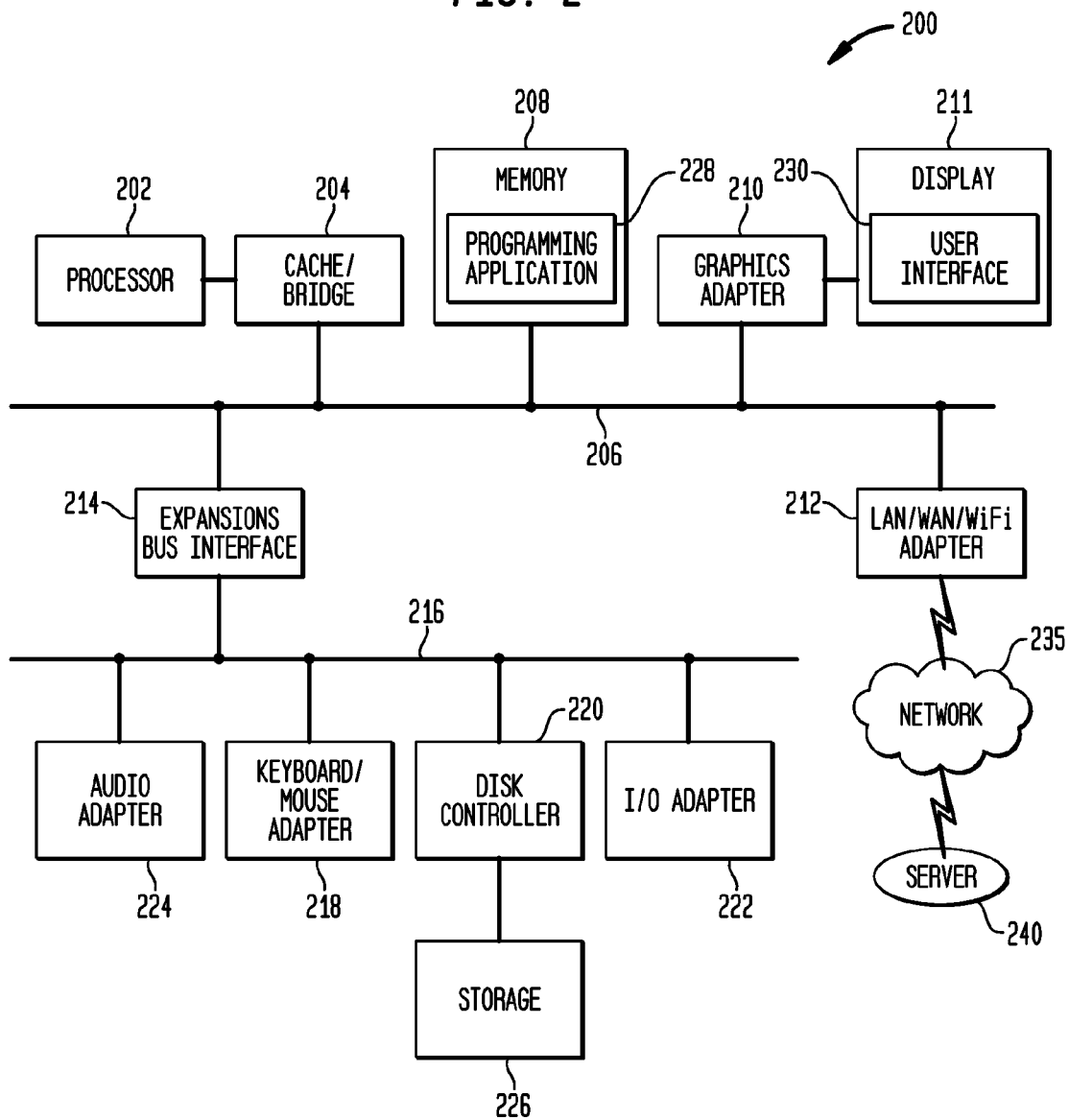
FIG. 2 illustrates a block diagram of a data processing system in which various embodiments of the present disclosure can be implemented.

FIG. 2 depicts a block diagram of a data processing system 200 in which an embodiment can be implemented. The data processing system 200 includes a processor 202 connected to a level two cache/bridge 204, which is connected in turn to a local system bus 206. The local system bus 206 may be, for example, a peripheral component interconnect (PCI) architecture bus. Also connected to local system bus in the depicted example are a main memory 208 and a graphics adapter 210. The graphics adapter 210 may be connected to a display 211.

Other peripherals, such as a local area network (LAN)/Wide Area Network/Wireless (e.g. WiFi) adapter 212, may also be connected to local system bus 206. An expansion bus interface 214 connects the local system bus 206 to an input/output (I/O) bus 216. The I/O bus 216 is connected to a keyboard/mouse adapter 218, a disk controller 220, and an I/O adapter 222. The disk controller 220 can be connected to a storage 226, which can be any suitable machine usable or machine readable storage medium, including but not limited to nonvolatile, hard-coded type mediums such as read only memories (ROMs) or erasable, electrically programmable read only memories (EEPROMs), magnetic tape storage, and user-recordable type mediums such as floppy disks, hard disk drives and compact disk read only memories (CD-ROMs) or digital versatile disks (DVDs), and other known optical, electrical, or magnetic storage devices.

Also connected to the I/O bus 216 in the example shown is an audio adapter 224, to which speakers (not shown) may be connected for playing sounds. The keyboard/mouse adapter 218 provides a connection for a pointing device (not shown), such as a mouse, trackball, trackpointer, etc. In some embodiments, the data processing system 200 may be implemented as a touch screen device, such as, for example, a tablet computer or touch screen panel. In these embodiments, elements of the keyboard/mouse adapter 218 may be implemented in the user interface 230 in connection with the display 211.

In various embodiments of the present disclosure, the data processing system 200 is a workstation in the automation system 100, such as report server 104 or client stations 106. The data processing system 200 implements a programming application 228. The programming application 228 is a software application that allows a user to create, modify, and/or delete a program code for a control program through user interface 230. The programming application 228 is an example of one implementation of programming application 111 in FIG. 1. In one example, the programming application 228 is Program Editor programming application.

The programming application 228 generates the user interface 230 displayed on display 211. The user interface 230 is an interface that allows a user to control elements within a program. For example, the user interface 230 may be a graphical user interface (GUI) or a command-line interface (CLI). The programming application 228 also allows for testing and/or debugging of control programs prior to, during, or after deployment in the automation system 100. The programming application 228 is also operatively configured to synchronize the control program residing on the workstation (e.g., as report server 104 or client stations 106) with the version of the control program presently executing in the field panel 102, field panels 108, and/or field controller 110 in the automation system 100.

When editing a program, the programming application 228 retrieves at least a portion of the program code for the program desired to be edited. The program to be edited may be a process running on one of field panels 108 or field controller 110. The programming application 228 may retrieve a current copy of the program code for the process from the field panels 108 or field controller 110 running the process. The programming application 228 may also retrieve a copy of the program code for the process from database 105 in report server 104. In one example, the program to be edited is a control program for a process for monitoring and/or controlling one or more field devices 112 in automation system 100.

Upon retrieval of the program code, programming application 228 displays lines of program code in the user interface 230 on the display 211. The program code may be portions of a control program used to control one or more devices in the automation system 100. In this example, the program code displayed in the user interface is source code. In one example, the control program is written in the PPCL programming language and one or more lines of code in the control program include one or more PPCL commands. Data processing system 200, field panel 102, and/or field panels 108, may interpret object or machine code executable by field panel 102, field panels 108, and/or field controller 110 from the written PPCL commands.

In various embodiments of the present disclosure, the data processing system 200 detects when a cursor pauses or "hovers-over" a point variable or a line number for a line of code displayed in the user interface 230 for a period of time. The data processing system 200 identifies the point variable or the point variables in the line of code and requests that a point value for the point variable or point variables be returned. For example, the data processing system 200 may send the request over LAN/WAN/Wireless adapter 212 to a network 235. In another example, the data processing system 200 may request the point value across MLN 120 to report server 104, field panel 102, or field panels 108 via field panel 102.

In sending the request, the data processing system 200 identifies whether the point variable is a part of a process monitored or controlled in the automation system 100. For example, the data processing system 200 identifies a point identifier of the point variable from the program code. The data processing system 200 uses the point identifier to query a database, such as for example, the database 105 in the report server 104 to identify the device that monitors the process associated with the point variable. For example, the point variable may be a temperature in a building. The data processing system 200 may query the database 105 to identify the field panel 108, field controller 110, and/or field device 112 that monitors the temperature in the building.

In various embodiments, if the point variable is stored within the database 105 of the report server 104, the data processing system 200 may retrieve the point variable from the database 105. For example, the data processing system 200 includes the point identifier for the point variable in the request. The report server 104 identifies that the point value of the point identifier is stored within database 105 and returns the point value for the point identifier in response to the request from the data processing system 200.

In some embodiments, the data processing system 200 may obtain a real-time current value for the point variable from a device that monitors the point variable in automation system 100. For example, if the point variable is maintained in the automation system 100, the database 105 returns a device identifier and/or routing number of the device that monitors the point variable. The data processing system 200 then uses the device identifier and/or routing number to send the request to the responsible device. For example, the data processing system 200 may send the request to field panel 102, field panels 108 via field panel 102, or field controllers 110 via field panels 108. The request may be received and processed by any of the devices in automation system 100 and forwarded to any appropriate devices in automation system 100. Similarly, once the point value has been retrieved, the point value may be forwarded to data processing system 200 by any of the devices in automation system 100. In various embodiments, the report server 104 may process the request for the data processing system 200 and return the point value for the point variable. For example, the report server 104 may obtain the point value from the appropriate field panel, field controller, and/or field device and forward the obtained point value to data processing system 200.

When the response to the request is received, the data processing system 200 displays the point value for the point variable in user interface 230. For example, the data processing system 200 may display the point value in a pop-up window in proximity to the location of the cursor or the location of the point variable. In another example, the data processing system 200 may display the point value next to, above, over or in proximity the point variable. In other examples, the data processing system 200 may display the point value anywhere in the user interface 230 or in a separate user interface.

Those of ordinary skill in the art will appreciate that the hardware depicted in FIG. 2 may vary for particular implementations. For example, other peripheral devices, such as an optical disk drive and the like, also may be used in addition or in place of the hardware depicted. The depicted example is provided for the purpose of explanation only and is not meant to imply architectural limitations with respect to the present disclosure.

One of various commercial operating systems, such as a version of Microsoft Windows™, a product of Microsoft Corporation located in Redmond, Wash. may be employed if suitably modified. The operating system is modified or created in accordance with the present disclosure as described, for example, to implement the programming application 228.

LAN/WAN/Wireless adapter 212 can be connected to a network 235, such as for example, MLN 120, (not a part of data processing system 200), which can be any public or private data processing system network or combination of networks, as known to those of skill in the art, including the Internet. Data processing system 200 can communicate over network 235 with server system 240, which is also not part of data processing system 200, but can be implemented, for example, as a separate data processing system 200. In some embodiments, server system 240 may be implemented in report server 104.

Figure 3:
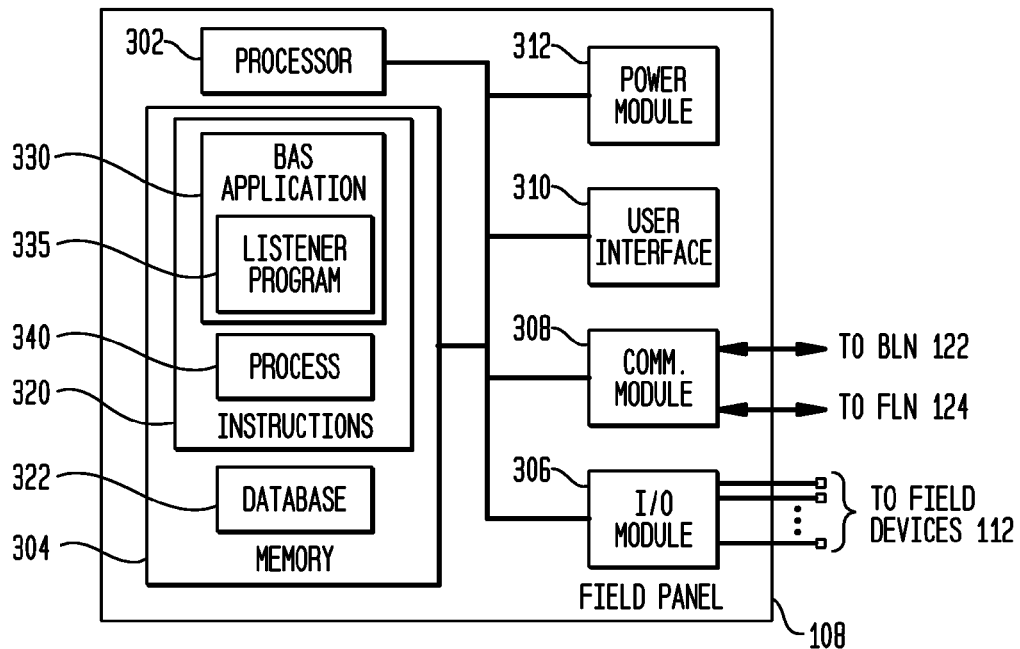
FIG. 3 illustrates an example of one of the field panels of FIG. 1 in accordance with disclosed embodiments.

FIG. 3 illustrates details of one of the field panels 108 in accordance with the present disclosure. For this particular embodiment, the field panel 108 comprises a processor 302, a memory 304, an input/output (I/O) module 306, a communication module 308, a user interface 310 and a power module 312. The memory 304 comprises any suitable data store capable of storing data, such as instructions 320 and a database 322. It will be understood that the field panel 108 may be implemented in any other suitable manner without departing from the scope of this disclosure.

The processor 302 is configured to operate the field panel 108. Thus, the processor 302 may be coupled to the other components 304, 306, 308, 310, and 312 of the field panel 108. The processor 302 may be configured to execute program instructions or programming software or firmware stored in the instructions 320 of the memory 304, such as building automation system (BAS) application software 330. In addition to storing the instructions 320, the memory 304 may also store other data for use by the automation system 100 in the database 322, such as various records and configuration files, graphical views, field device 112 identifiers and associated values, and/or other information.

In various embodiments, the BAS application software 330 includes one or more listener programs 335 designed to receive and process requests for point values of point variables. For example, listener programs 335 may be operatively configured to process requests for point values monitored or controlled by the field devices 112. Upon receipt of the request for the point value, the listener program 335 identifies the point variables requested. For example, the listener program 335 may identify a field device 112 that the request is associated with and/or a process operating in the field panel 108 that monitors the point variable in the request. In one example, the listener program 335 retrieves the requested point values from one or more predefined logical points that are maintained in database 322 and provide time-based and system status information.

In some embodiments, the listener program 335 may retrieve the point value from process 340. In these illustrative embodiments, process 340 is a process for monitoring and/or controlling one or more field controllers 110 and/or field devices 112. For example, the process 340 may include threads that run in parallel to threads from the BAS application software 330. In other examples, the process 340 may be part of the BAS application software 330 and running concurrent with or under the control of the BAS application software 330. In one example, process 340 is a process for monitoring and/or controlling the point value of the point variable requested.

If the requested point value is associated with a device or process that is not maintained in database 322 or monitored by the field panel 108, the listener program 335 may identify another process or device that monitors the requested point value. For example, the request for the point value may include the device identifier and routing information for the device and/or process monitoring the requested point value. The listener program 335 can forward the request for the point value from the field panel 108 to the appropriate device and/or process. If the requested point value is associated with a device or process that is not maintained in database 322 or monitored by the field panel 108, the listener program 335 may return an error message.

Execution of the BAS application 330 by the processor 302 may result in control signals being sent to any field devices 112 that may be coupled to the field panel 108 via the I/O module 306 of the field panel 108. Execution of the BAS application 330 may also result in the processor 302 receiving status signals and/or other data signals from field devices 112 coupled to the field panel 108 and storage of associated data in the memory 304. For example, in some embodiments, the listener program 335 generates one or more control signals to request a present point value of a requested point variable or logical point being monitored and/or controlled by the field device 112 from the identified field device 112.

For example, field panel 108 may control and monitor a field device 112 that controls a temperature in a building (i.e., a temperature point). The listener program 335 can generate a request for the field device 112 to return a point value for the current building temperature point via the I/O module 306. In one embodiment, the BAS application 330 may be provided by APOGEE® PXC model controller software commercially available from Siemens. However, it will be understood that the BAS application 330 may comprise any other suitable BAS control software.

The I/O module 306 may comprise one or more input/output circuits that are configured to communicate directly with field devices 112. Thus, for some embodiments, the I/O module 306 comprises analog input circuitry for receiving analog signals and analog output circuitry for providing analog signals.

The communication module 308 is configured to provide communication with the field panel 102, other field panels 108 and other components on the BLN 122. The communication module 308 is also configured to provide communication to the field controllers 110, as well as other components on the FLN 124 that is associated with the field panel 108. Thus, the communication module 308 may comprise a first port that may be coupled to the BLN 122 and a second port that may be coupled to the FLN 124. Each of the ports may include an RS-485 standard port circuit or other suitable port circuitry.

The field panel 108 may be capable of being accessed locally via the interactive user interface 310. A user may control the collection of data from field devices 112 through the user interface 310. The user interface 310 of the field panel 108 may include devices that display data and receive input data. These devices may be permanently affixed to the field panel 108 or portable and moveable. For some embodiments, the user interface 310 may comprise an LCD-type screen or the like and a keypad. The user interface 310 may be configured to both alter and show information regarding the field panel 108, such as status information and/or other data pertaining to the operation of, function of and/or modifications to the field panel 108.

The power module 312 may be configured to supply power to the components of the field panel 108. The power module 312 may operate on standard 120 volt AC electricity, other AC voltages or DC power supplied by a battery or batteries.

Figure 4:
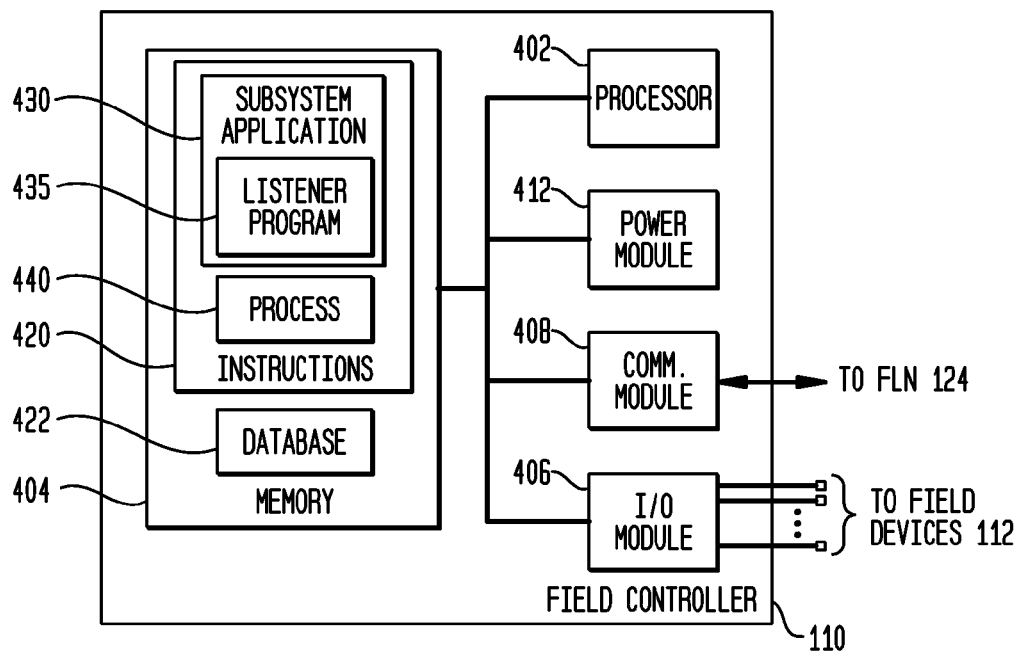
FIG. 4 illustrates an example of one of the field controllers of FIG. 1 in accordance disclosed embodiments.

FIG. 4 illustrates details of one of the field controllers 110 in accordance with the present disclosure. For this particular embodiment, the field controller 110 comprises a processor 402, a memory 404, an input/output (I/O) module 406, a communication module 408 and a power module 412. For some embodiments, the field controller 110 may also comprise a user interface (not shown in FIG. 4) that is configured to alter and/or show information regarding the field controller 110. The memory 404 comprises any suitable data store capable of storing data, such as instructions 420 and a database 422. It will be understood that the field controller 110 may be implemented in any other suitable manner without departing from the scope of this disclosure. For some embodiments, the field controller 110 may be positioned in, or in close proximity to, a room of the building where temperature or another environmental parameter associated with the subsystem may be controlled with the field controller 110.

The processor 402 is configured to operate the field controller 110. Thus, the processor 402 may be coupled to the other components 404, 406, 408 and 412 of the field controller 110. The processor 402 may be configured to execute program instructions or programming software or firmware stored in the instructions 420 of the memory 404, such as subsystem application software 430. For a particular example, the subsystem application 430 may comprise a temperature control application that is configured to control and process data from all components of a temperature control subsystem, such as a temperature sensor, a damper actuator, fans, and various other field devices. In addition to storing the instructions 420, the memory 404 may also store other data for use by the subsystem in the database 422, such as various configuration files, field device 112 identifiers and associated point values monitored and/or controlled by the field devices 112, and/or other information.

In various embodiments, subsystem application 430 includes one or more listener programs 435 designed to receive and process requests for point values of point variables or logical points. Upon receipt of the request for the point value, the listener program 435 identifies the point variables requested. For example, the listener program 435 may identify a field device 112 the request is associated with and/or a process operating in the field controller 110 that monitors the point variable in the request. In one example, the listener program 435 retrieves the requested point values from one or more predefined logical points that are maintained in database 422 and provide time-based and system status information.

In some embodiments, the listener program 435 may retrieve the point value from process 440. In these illustrative embodiments, process 440 is a process for monitoring and/or controlling one or more field devices 112. For example, the process 440 may include threads that run in parallel to threads from the subsystem application 430. In other examples, the process 440 may be part of the subsystem application 430 and running concurrent with or under the control of the subsystem application 430. In one example, process 440 is a process for monitoring and/or controlling the point value of the point variable requested.

If the requested point value is associated with a device or process that is not maintained in database 422 or monitored by the field controller 110, the listener program 435 may identify another process or device that monitors the requested point value. For example, the request for the point value may include the device identifier and routing information for the device and/or process monitoring the requested point value. The listener program 435 can forward the request for the point value from the field controller 110 to the appropriate device and/or process. If the requested point value is associated with a device or process that is not maintained in database 422 or monitored by the field controller 110, the listener program 435 may return an error message.

Execution of the subsystem application 430 by the processor 402 may result in control signals being sent to any field devices 112 that may be coupled to the field controller 110 via the I/O module 406 of the field controller 110. Execution of the subsystem application 430 may also result in the processor 402 receiving status signals and/or other data signals from field devices 112 coupled to the field controller 110 and storage of associated data in the memory 404. For example, in some embodiments, the listener program 435 generates one or more control signals to request the present point value of a requested point variable or logical point being monitored and/or controlled by the field device 112 from the identified field device 112. For example, field controller 110 may control and monitor a field device 112 that monitors and/or controls a temperature point in a building. The listener program 435 can generate a request for the field device 112 to return a point value for the current building temperature point via the I/O module 406.

The I/O module 406 may comprise one or more input/output circuits that are configured to communicate directly with field devices 112. Thus, for some embodiments, the I/O module 406 comprises analog input circuitry for receiving analog signals and analog output circuitry for providing analog signals.

The communication module 408 is configured to provide communication with the field panel 108 corresponding to the field controller 110 and other components on the FLN 124, such as other field controllers 110. Thus, the communication module 408 may comprise a port that may be coupled to the FLN 124. The port may include an RS-485 standard port circuit or other suitable port circuitry.

The power module 412 may be configured to supply power to the components of the field controller 110. The power module 412 may operate on standard 120 volt AC electricity, other AC voltages, or DC power supplied by a battery or batteries.

Figure 5:
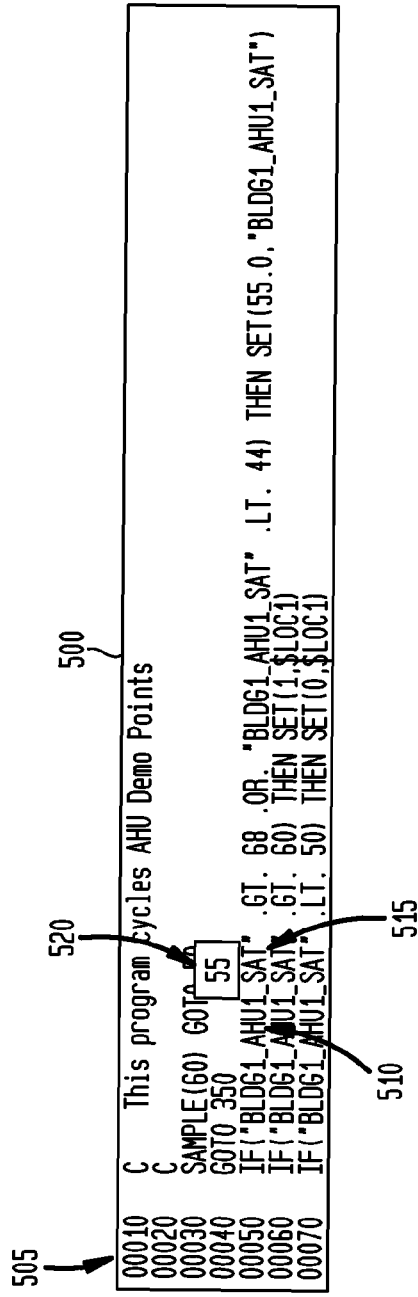
FIG. 5 illustrates an example of a point value associated with a point variable displayed in a user interface in accordance with disclosed embodiments.

FIG. 5 illustrates an example of a point value associated with a point variable or field device point displayed in a user interface 500 in accordance with disclosed embodiments. In this illustrative example, the user interface 500 includes a display of lines of program code 505. The lines of program code 505 may be part of a control program being modified or edited in a programming application, such as, for example, the programming application 228 in FIG. 2. In this illustrative example, a data processing system, such as, data processing system 200, report server 104, or client stations 106, may execute program code for programming application 228 and generate user interface 500.

In this illustrative example, a cursor 510 displayed in the user interface 500 is paused over a point variable 515. In this example, the point variable 515 is "BLDG1_AHU1_SAT". The user interface 500 includes a display of a point value 520 for the point variable 515. In this example, the point value 520 for the point variable 515 is "55". Thus, the user interface 500 not only provides the user with the ability to create and modify lines of program code 505 but also displays the point value 520 for the point variable 515 in association with a line of program code.

Figure 6:
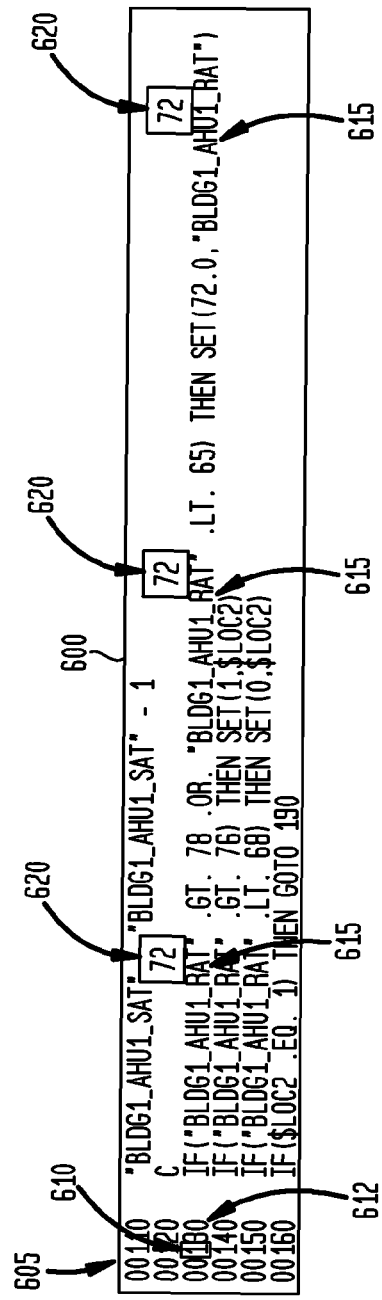
FIG. 6 illustrates an example of point values associated with a line of program code displayed in a user interface in accordance with disclosed embodiments.

FIG. 6 illustrates an example of point values associated with a line of program code displayed in a user interface 600 in accordance with disclosed embodiments. In this illustrative example, the user interface 600 includes a display of lines of program code 605. The lines of program code 605 may be part of a control program being modified or edited in a programming application, such as, for example, the programming application 228 in FIG. 2. In this illustrative example, a data processing system, such as, data processing system 200, report server 104, or client stations 106, may execute program code for programming application 228 and generate user interface 600.

In this illustrative example, a cursor 610 displayed in the user interface 600 has selected line number 612. For example, cursor 610 may have paused over or actuated line number 612. The selected line number 612 includes point variables 615. In this example, the point variables 615 are "BLDG1_AHU1_RAT". The user interface 600 includes a display of point values 620 for the point variables 615. In this example, the point values 620 for the point variables 615 are "72". Thus, the user interface 600 not only provides the user with the ability to create and modify lines of program code 605 but displays the point values 620 for the point variables 615 in association with a line of program code.

The illustrations of user interface 500 in FIG. 5 and user interface 600 in FIG. 6 are not meant to imply physical or architectural limitations to the manner in which different illustrative embodiments may be implemented. For example, in some embodiments, returned point values may be displayed in different locations or in a separate user interface. In other embodiments, the user interfaces 500 and 600 may be displayed on a touch screen device. Thus, the cursors 510 and 610 may be a result of a user touch input and may not be displayed in the user interfaces 500 and 600.

Figure 7:
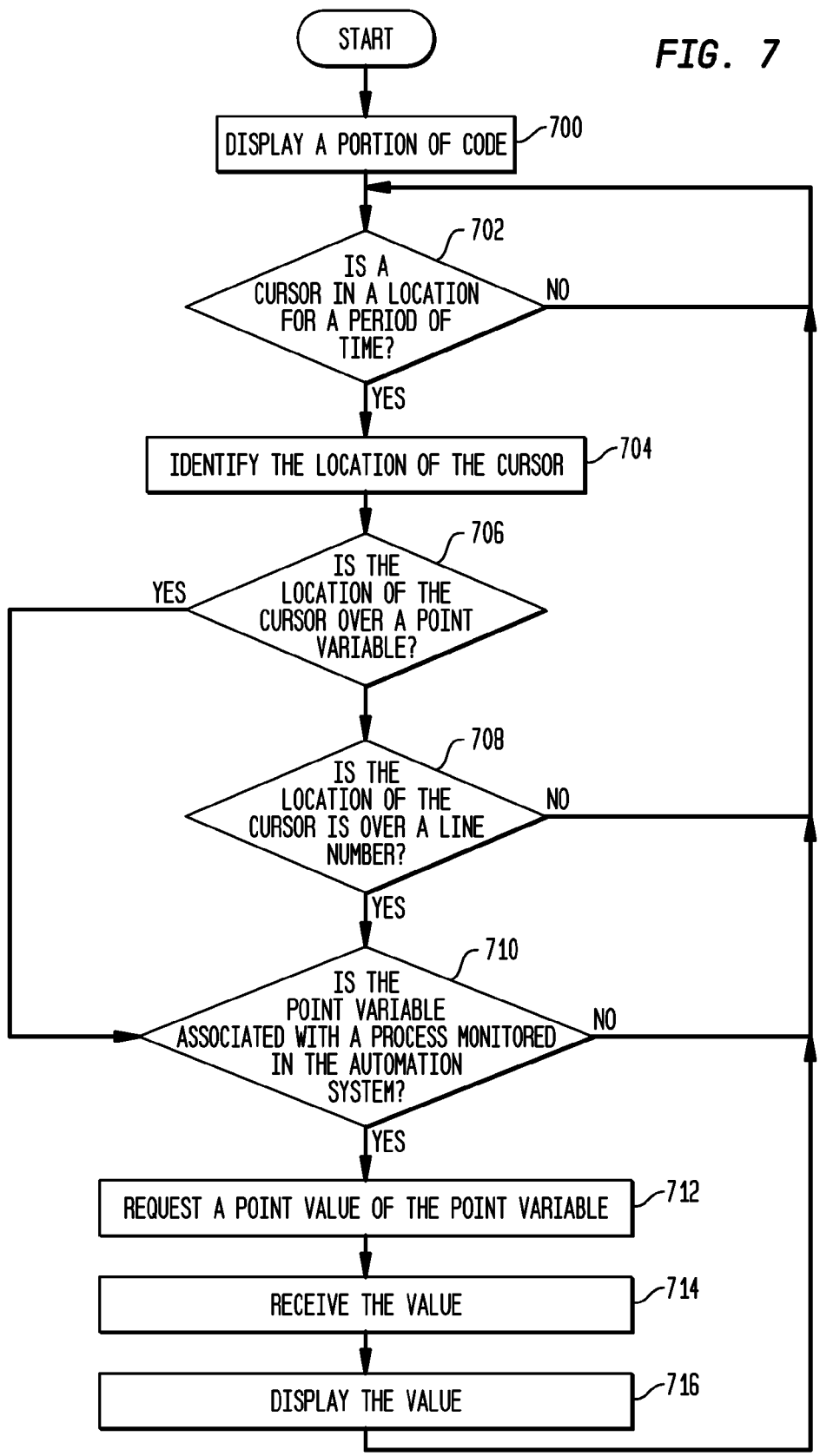
FIG. 7 depicts a flowchart of a process for displaying a point value in accordance with disclosed embodiments.

FIG. 7 depicts a flowchart of a process for displaying a point value in accordance with disclosed embodiments. This process can be performed, for example, by one or more data processing systems, such as, for example, data processing system 200, configured to perform acts described below, referred to in the singular as "the system." The process can be implemented by executable instructions stored in a non-transitory computer-readable medium that cause one or more data processing systems to perform such a process. For example, programming application 228 may comprise the executable instructions to cause one or more data processing systems to perform such a process.

The process begins by the system displaying a portion of code (step 700). The portion of code may be all or part of a control program for a process running in automation system 100. For example, the process may be a process for monitoring and/or controlling a point variable. In one example, programming application 228 obtains the portion of code from a device, for example, field panels 108 or field controllers 110, running the process. The programming application 228 may generate a graphical user interface, for example, user interface 500 or 600, and display the portion of code in the graphical user interface generated on display 211 in client station 106.

The system detects a cursor in a location for a period of time (step 702). For example, the period of time may be about one second or any other predetermined amount of time. In various embodiments, cursor may be a cursor for a mouse or a touch input. For example, programming application 228 may detect cursor 510 or 610 in user interface 500 or 600.

The system identifies the location of the cursor (step 704). For example, the system may identify the coordinates of a tip of the cursor on a user interface.

The system determines whether the location of the cursor is over a point variable (step 706). For example, the system may identify elements of the user interface to determine whether the coordinates of the cursor are collocated with or in a threshold distance of a point variable in a line of code displayed in the user interface. For example, programming application 228 may detect cursor 510 over point variable 515 in user interface 500. If the location of the cursor is over a point variable, the system then proceeds to step 710, discussed below.

If the location of the cursor is not over a point variable, the system determines whether the location of the cursor is over a line number (step 708). For example, the cursor may have paused over or otherwise selected a line number for a line of program code displayed in the user interface. For example, programming application 228 may detect cursor 610 over line number 612 in user interface 600. When the location of the cursor is over a line number, the system can request and display point values for each point variable in the line of program code as discussed below. If the location of the cursor is not over a line number or a point variable, the system returns to step 702 to continue to monitor cursor location.

The system determines whether the point variable or point variables are associated with a process monitored in the automation system (step 710). For example, programming application 228 may identify a point identifier of the point variable(s) 515 or 615. Programming application 228 may use the point identifier to query database 105 to identify a device, for example, field panels 108 or field controllers 110, in the automation system 100 that monitors the process and receive routing information and a device identifier of the device if the point variable(s) 515 or 615 are associated with a process monitored in the automation system 100. In various embodiments, the database stores routing information and device identifiers for all field devices, field controllers, and field panels maintained in the automation system. Thus, the system can receive current point values of point variables for any process or device maintained in the entire automation system. However, if the point variable or point variables are not associated with a process monitored in the automation system, the system may not be able if identity the requested point values and may return an error message.

The system requests a point value or point values associated with a point variable or point variables in the location or line number (step 712). For example, the system may include the routing information and the device identifier received to route the request to the proper field panels, field controllers, and/or field devices. For example, programming application 228 may request point value(s) 520 or 620 from one of field panels 108 or field controllers 110 in automation system 100.

The system receives the point value or point values associated with the point variable or point variables (step 714). For example, the programming application 228 may receive the point value or point values from one or more field panels 108, field controllers 110, and/or field devices 112 that monitor processes associated with the point variable.

The system displays the point value or point values (step 716). For example, programming application 228 may display the point value(s) 520 or 620 in user interface 500 or 600 in association with the point variable (s) 515 or 615. The system then returns to step 702 to continue to monitor cursor location. The process may end upon user request or upon termination of the programming application.

Figure 8:
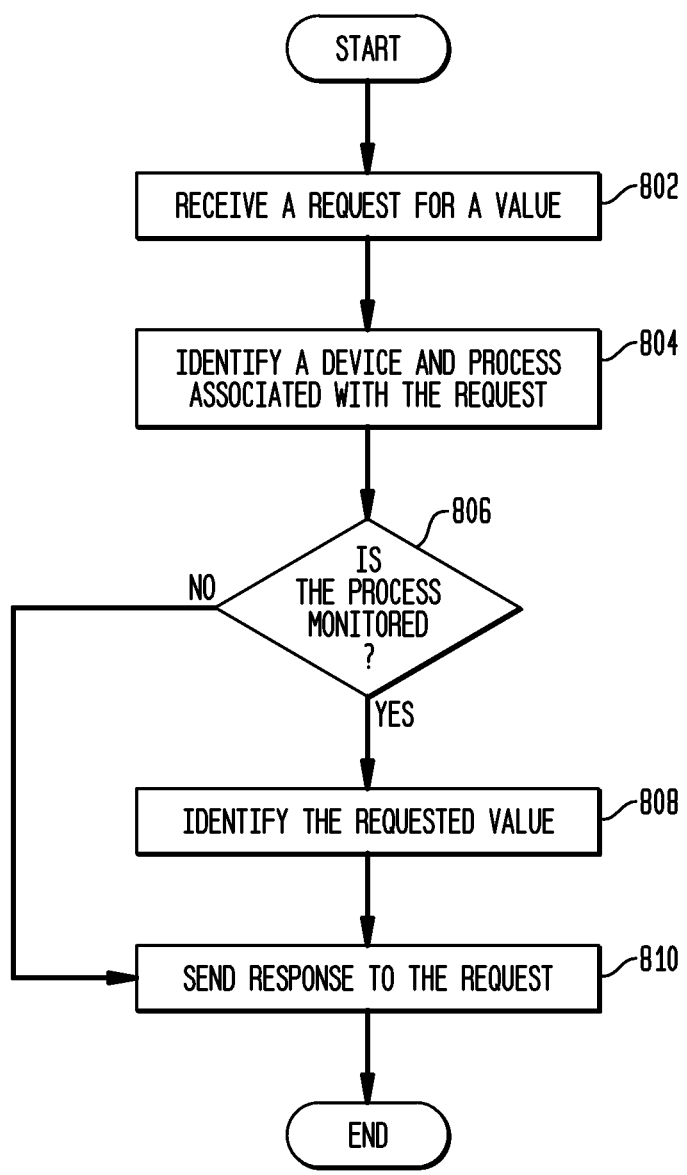
FIG. 8 depicts a flowchart of a process for retrieving a point value in accordance with disclosed embodiments.

FIG. 8 depicts a flowchart of a process for retrieving a point value in accordance with disclosed embodiments. This process can be performed, for example, by one or more data processing systems, such as, for example, report server 104, field panel 108 and/or field controller 110, configured to perform acts described below, referred to in the singular as "the system." The process can be implemented by executable instructions stored in a non-transitory computer-readable medium that cause one or more data processing systems to perform such a process. For example, listener programs 335 and 435 may comprise the executable instructions to cause one or more data processing systems to perform such a process.

The system receives a request for a point value (step 802). For example, listener programs 335 or 435 may receive a request for point value(s) 520 or 620 for point variable(s) 515 or 615.

The system identifies a device and process associated with the request (step 804). For example, the device and process information may be included in the request. For example, listener programs 335 or 435 may identify that point value(s)

520 or 620 may be obtained from one of field panels 108, field controllers 110, and/or field devices 112.

The system determines whether the process is monitored (step 806). For example, the system determines whether the device and/or process are monitored by or under control of the system. In one example, report server 104 may determine from database 105 whether the process and/or device associated with the request are under control or monitored in automation system 100. In another example, listener programs 335 or 435 may determine from database 322 or 422 whether the process and/or device associated with the request are under control or monitored by the field panel 108 or field controller 110. If the system cannot return the requested point value, for example, because the process is not monitored by the system, the system proceeds to step 810 discussed below.

If the process is monitored, the system identifies the requested point value (step 808). For example, the report server 104 may retrieve the requested point value(s) 520 or 620 from database 105 maintaining point values for processes and devices under control or monitored in automation system 100. In another example, the listener programs 335 or 435 may identify the requested point value(s) 520 or 620 directly from the field panel 108, field controller 110, or field device 112.

The system sends response to the request (step 810). For example, the listener programs 335 or 435 may return the point value(s) 520 or 620 for the requested point variable(s) 515 or 615 to programming application 228 for display in user interface 500 or 600. If the system cannot return the requested point value, the system may send an error message including details why the requested point values could not be returned. Thereafter, the process ends.

Of course, those of skill in the art will recognize that, unless specifically indicated or required by the sequence of operations, certain steps in the processes described above may be omitted, performed concurrently or sequentially, or performed in a different order.

Those skilled in the art will recognize that, for simplicity and clarity, the full structure and operation of all data processing systems suitable for use with the present disclosure is not being depicted or described herein. Instead, only so much of a data processing system as is unique to the present disclosure or necessary for an understanding of the present disclosure is depicted and described. The remainder of the construction and operation of data processing system 100 may conform to any of the various current implementations and practices known in the art.

It is important to note that while the disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, or function is an essential element which must be included in the claim scope: the scope of patented subject matter is defined only by the allowed claims. Moreover, none of these claims are intended to invoke paragraph six of 35 USC §112 unless the exact words "means for" are followed by a participle.

What is claimed is:

1. A method performed by a data processing system in an automation system, the method comprising:
   displaying, in a user interface and by the data processing system, a portion of code associated with a process running in a device in the automation system that is remote from the data processing system, the process associated with a point variable in the automation system, the portion of code including the point variable, the point variable being a value of an input or output of the device in the automation system;
   responsive to detecting a cursor in a location associated with the user interface for a period of time, identifying the location of the cursor in the user interface by the data processing system;
   identifying, by a listener program executing in the data processing system, the process and the device in the automation system that is associated with the portion of code;
   requesting, by the data processing system, a point value of the point variable in the portion of code and associated with the location of the cursor;
   receiving the point value of the point variable over a network connection; and
   displaying the point value in the user interface in association with the point variable.

2. The method of claim 1, wherein requesting the point value of the point variable comprises:
   identifying a point identifier of the point variable in the portion of code; and
   requesting the point value from a database storing values for the process using the point identifier, wherein the point value for the process is updated in the database one of periodically and in response to receiving a request for the point value from the data processing system.

3. The method of claim 1 further comprising:
   identifying a point identifier of the point variable in the portion of code;
   querying a database by the listener program to identify the device in the automation system that monitors the value of the input or output of the automation device; and
   receiving routing information and a device identifier of the device.

4. The method of claim 3, wherein requesting the point value of the point variable comprises:
   requesting the point value from the device that monitors the value of the input or output of the automation device using the routing information and the device identifier of the device, wherein the point value is a real-time value retrieved across the network connection from the device monitoring the value of the input or output of the automation device.

5. The method of claim 3, wherein the database stores routing information and device identifiers for a plurality of field devices performing automation processes in the automation system and a plurality of controllers controlling one or more of the plurality of field devices in the automation system.

6. The method of claim 1, wherein the process is operating on a device configured to monitor the point value associated with the point variable.

7. The method of claim 1 further comprising:
determining whether the location of the cursor is over the point variable in a line of program code via a programming application hosted in the data processing system for at least one of debugging and editing program code for the process operating on a device in the automation system.

8. The method of claim 1, wherein requesting the point value of the point variable in the portion of code and associated with the location of the cursor comprises responsive to identifying that the location of the cursor is over a line number in a line of program code, requesting a point value for each of a plurality of point variables in the line of program code, and wherein displaying the point value in the user interface comprises displaying the point value for each of the point variables in the line of program code.

9. A data processing system in an automation system, the data processing system comprising:
a processor; and
an accessible memory, the data processing system particularly configured to:
generate a display of, in a user interface, a portion of code associated with a process running in a device in the automation system that is remote from the data processing system, the process associated with a point variable in the automation system, the portion of code including the point variable, the point variable being a value of an input or output of an automation device in the automation system;
identify a location of a cursor in the user interface in response to detecting the cursor in the location associated with the user interface for a period of time;
identify, by a listener program, the process and the device in the automation system that is associated with the portion of code;
request a point value of the point variable in the portion of code and associated with the location of the cursor;
receive the point value associated with the point variable over a network connection; and
generate a display of the point value in the user interface in association with the point variable.

10. The data processing system of claim 9, wherein the data processing system requests the point value of the point variable by identifying a point identifier of the point variable in the portion of code and requesting the point value from a database storing values for the process using the point identifier, wherein the point value for the process is updated in the database one of periodically and in response to receiving a request for the point value from the data processing system.

11. The data processing system of claim 9, wherein the data processing system is further configured to identify a point identifier of the point variable in the portion of code, query a database by the listener program to identify a device in the automation system that monitors the value of the input or output of the automation device, and receive routing information and a device identifier of the device.

12. The data processing system of claim 11, wherein the data processing system requests the point value of the variable by requesting the point value from the device that monitors the value of the input or output of the automation device using the routing information and the device identifier of the device, wherein the point value is a real-time value retrieved across the network connection from the device monitoring the value of the input or output of the automation device.

13. The data processing system of claim 9, wherein the data processing system is further configured to determine whether the location of the cursor is over the point variable in a line of program code via a programming application hosted in the data processing system for at least one of debugging and editing program code for the process operating on a device in the automation system.

14. The data processing system of claim 9, wherein the data processing system requests the point value of the point variable in the portion of code and associated with the location of the cursor by requesting a point value for each of a plurality of point variables in a line of program code in response to identifying that the location of the cursor is over the line number in a line of program code and wherein the data processing system generates a display of the point value in the user interface by generating a display of the point value for each of the point variables in the line of program code.

15. A non-transitory computer-readable medium encoded with executable instructions that, when executed, cause one or more data processing systems in an automation system to:
generate a display of, in a user interface, a portion of code associated with a process running in the automation system, the process associated with a point variable in the automation system, the portion of code including the point variable, the point variable being a value of an input or output of an automation device in the automation system;
identify a location of a cursor in a user interface in response to detecting the cursor in the location associated with the user interface for a period of time;
identify, by a listener program, the process and the device in the automation system that is associated with the portion of code;
request a point value of the point variable in the portion of code and associated with the location of the cursor;
receive the point value associated with the point variable over a network connection; and
generate a display of the point value in the user interface in association with the point variable.

16. The computer-readable medium of claim 15, wherein the instructions that cause the data processing system to request the point value of the point variable comprise instructions that cause the data processing system to identify a point identifier of the point variable in the portion of code and request the point value from a database storing values for the process using the point identifier, wherein the point value for the process is updated in the database one of periodically and in response to receiving a request for the point value from the data processing system.

17. The computer-readable medium of claim 15, wherein the computer-readable medium is further encoded with executable instructions that, when executed, cause one or more data processing systems to identify a point identifier of the point variable in the portion of code, query a database by the listener program to identify a device in the automation system that monitors the value of the input or output of the automation device, and receive routing information and a device identifier of the device.

18. The computer-readable medium of claim 17, wherein the instructions that cause the data processing system to request the point value of the point variable comprise instructions that cause the data processing system to request the point value from the device that monitors the value of the input or output of the automation device using the routing information and the device identifier of the device, wherein the point value is a real-time value retrieved across the network connection from the device monitoring value of the input or output of the automation device.

19. The computer-readable medium of claim 15, wherein the computer-readable medium is further encoded with executable instructions that, when executed, cause one or more data processing systems to determine whether the location of the cursor is over the point variable in a line of program code via a programming application hosted in the data processing system for at least one of debugging and editing program code for controlling the process operating on a device in the automation system.

20. The computer-readable medium of claim 15, wherein the instructions that cause the data processing system to request the point value of the point variable in the portion of code and associated with the location of the cursor comprise instructions that cause the data processing system to request a point value for each of a plurality of point variables in a line of program code in response to identifying that the location of the cursor is over the line number in a line of program code and wherein the instructions that cause the data processing system to generate a display of the point value in the user interface comprise instructions that cause the data processing system to generate a display of the point value for each of the point variables in the line of program code.

* * * * *